Sept. 24, 1968  J. C. GUNDRY ET AL  3,403,395
COMPACT ELECTRONIC DEVICE WITH COMPONENTS
MOUNTED ON A CASE COVER
Filed Oct. 22, 1965
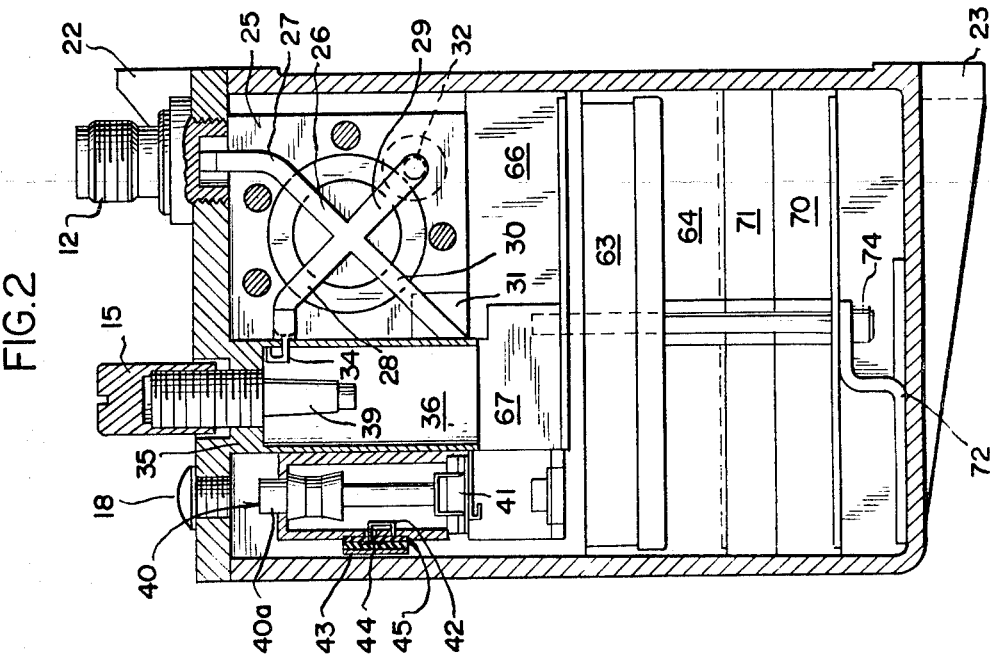
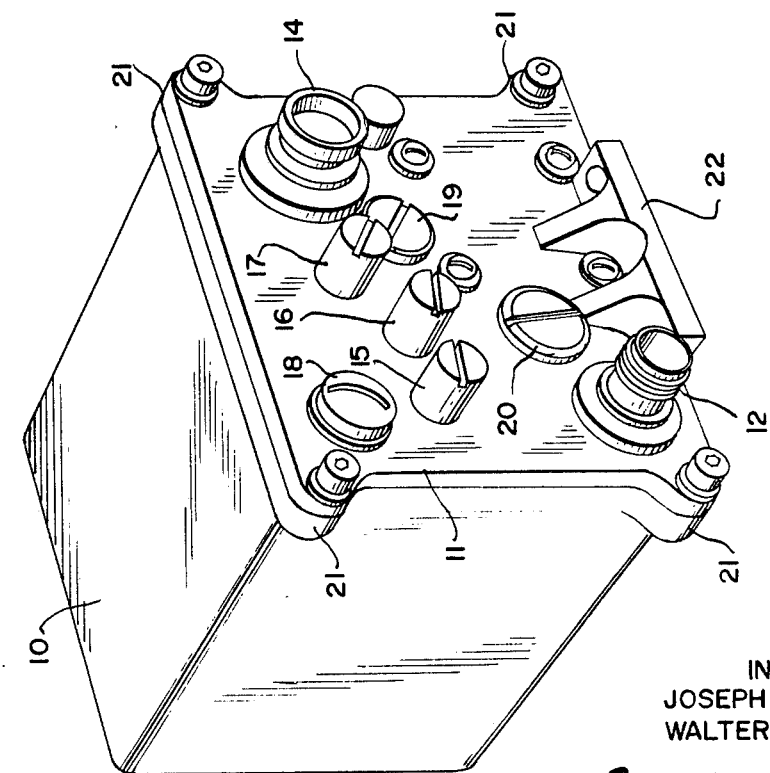
INVENTORS
JOSEPH C. GUNDRY
WALTER J. NOBLE
BY Mueller, Aichele & Lauver
ATTORNEYS

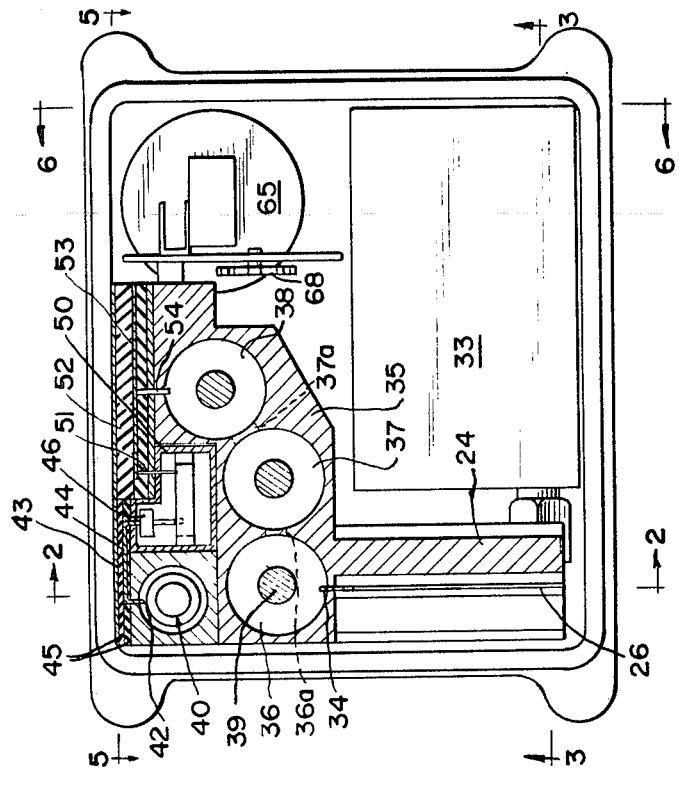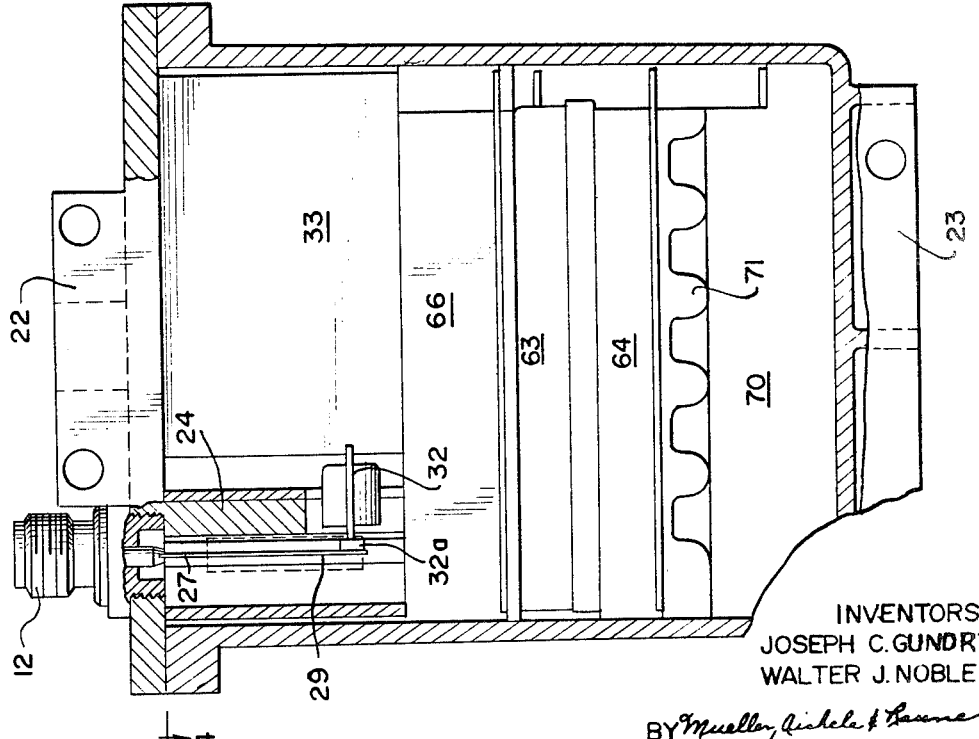

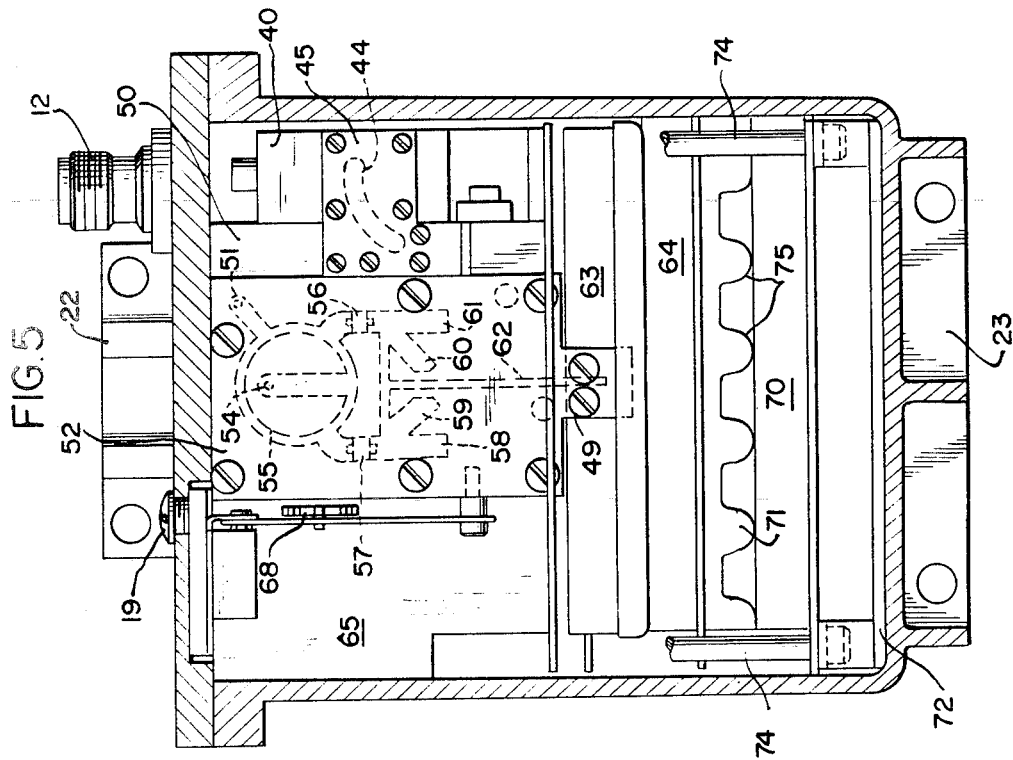
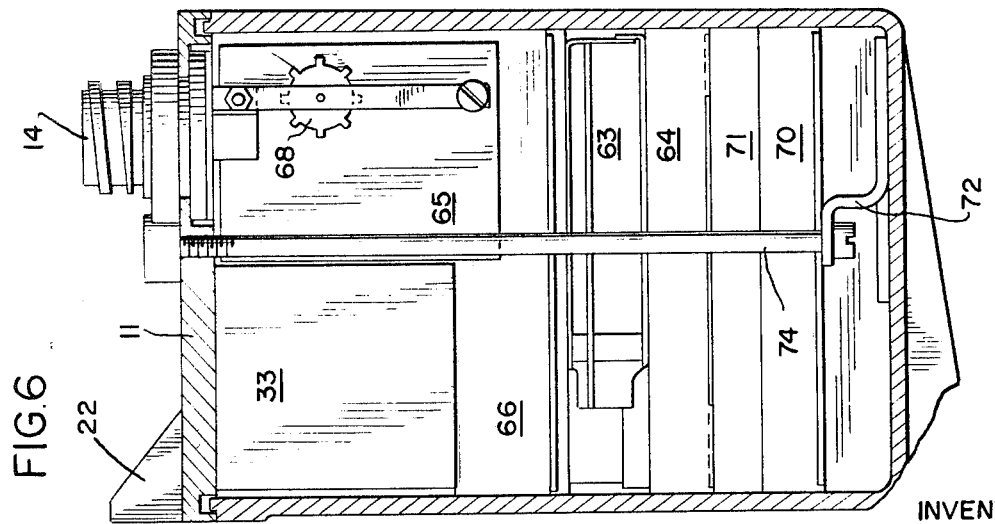

United States Patent Office 3,403,395
Patented Sept. 24, 1968

3,403,395
COMPACT ELECTRONIC DEVICE WITH COMPONENTS MOUNTED ON A CASE COVER
Joseph C. Gundry, Phoenix, and Walter J. Noble, Mesa, Ariz., assignors to Motorola, Inc., Franklin Park, Ill., a corporation of Illinois
Filed Oct. 22, 1965, Ser. No. 500,572
12 Claims. (Cl. 343—6.8)

ABSTRACT OF THE DISCLOSURE

All components of an electronic device are mounted on a heat sink cover and insertable into an open ended case. The components are movable a slight amount toward and away from the cover and when inserted into the case all components are under compression for preventing vibration. High heat dissipating components are mounted adjacent the cover with compressible material being between components remote from the cover.

---

This invention relates generally to transponder units for use in radar systems, and more particularly to a compact unit suitable for use in missiles and other aircraft.

In order to facilitate the tracking of missiles and other aircraft, transponder units have been provided on the aircraft to cooperate with radar equipment on the ground. This transponder equipment includes a receiver for receiving the radar pulses, and a transmitter for transmitting signals in accordance with the received pulses. For proper operation, the receiver must be highly selective so that only the desired signals are received and these are separated from undesired signals and noise. The receiver may include a decoder which is coupled to the modulator of the transmitter to transmit signals in accordance with the particular signals which have been received. The transmitter must produce substantial power and may include a magnetron which is triggered by the modulator to produce pulses of radio frequency signals.

Although satisfactory transponder units have been provided, these have been of a size and weight which have been greater than desired for many applications. Inasmuch as the units may be installed in space craft wherein the space available is at a premium, it is desired that the transponder be provided in a very compact form. It is, however, necessary that the unit work effectively, have high sensitivity, and provide the same or better quality operation than the prior transponders of large size. It is also necessary that the heat developed by the components of the unit be effectively conducted therefrom.

It is, therefore, an object of the present invention to provide an improved, compact transponder unit.

Another object of the invention is to provide a transponder unit including a circulator for coupling the transmitter and receiver to an antenna, with the receiver and transmitter components being physically positioned with respect to the circulator so that a minimum of space is required.

A further object of the invention is to provide a transponder unit which includes a highly selective receiver and a relatively powerful transmitter, with the components being arranged to effectively conduct heat developed inside the unit to the housing thereof, so that components are maintained within the required temperature range.

A feature of the invention is the provision of a transponder apparatus having a circulator for connection to an antenna and having a conductor directly connected to the radio frequency (R.F.) filter of the receiver for applying signals thereto, and wherein the filter and local oscillator for the receiver are compactly arranged with the mixer so that the receiver structure is provided in a very small space. The magnetron of the transmitter of the unit is also positioned adjacent the circulator and is directly connected to the conductor thereof.

Another feature of the invention is the provision of a receiver for a transponder having an R.F. filter and a local oscillator having walls extending in the same plane, and a strip line mixer having a wall adjacent the walls of the filter and local oscillator, and connected therethrough to form a compact unit.

A further feature of the invention is the provision of a transponder unit in a compact housing with certain parts which produce heat connected to the front cover of the housing to conduct heat thereto and at least one part positioned to engage a different side of the housing to conduct heat thereto. More specifically, the heat from the magnetron oscillator of the transmitter, the transistor local oscillator of the receiver, and the transistors of the power supply is conducted to the front cover, and the heat from the silicon controlled rectifier of the modulator is conducted to the rear of the housing.

A still further feature of the invention is the provision of a transponder unit having components thereof embedded in a resilient material, and which includes one member made of such material and of a configuration to be compressible, so that the unit is compressed when positioned in a housing and expands in a direction transverse to the compression to engage the housing and thereby form a rigid unit.

The invention is illustrated in the drawings wherein:

FIG. 1 is a perspective view showing the assembled unit;

FIG. 2 is a cross-sectional view substantially along line 2—2 of FIG. 4;

FIG. 3 is a cross-sectional view substantially along the line 3—3 of FIG. 4;

FIG. 4 is a cross-sectional view substantially along the line 4—4 of FIG. 3 with parts broken away for clarity;

FIG. 5 is a cross-sectional view substantially along the line 5—5 of FIG. 4; and FIG. 6 is a cross-sectional view along the line 6—6 of FIG. 4.

The transponder of the invention includes a housing having a main portion forming a five-sided receptacle and a front cover portion. The cover portion supports a circulator of rectangular configuration having a flat center conductor with four arms extending from a single center junction. The arms are connected respectively to the antenna, the R.F. filter of the receiver, the magnetron oscillator of the transmitter, and a terminating load. A coupling loop of the R.F. filter is directly connected to the center conductor so that an effective connection is provided with a minimum discontinuity. The connection to the magnetron is provided by a pin extending at a right angle to the center conductor, with the magnetron being positioned so that a very short connection is required.

The receiver includes a solid state local oscillator (L.O.) which applies signals through a strip line to a varactor diode which multiplies the frequency, and the multiplied signals are selected by an interdigital filter. The filter has a wall extending flush with a wall of the R.F. filter, and the outputs of the L.O. filter and the R.F. filter extend from these walls to the flat mixer unit which overlaps the walls. The mixer includes a strip line having a pair of diodes connected in a balanced circuit for providing the intermediate frequency signal. The mixer has a portion in engagement with an intermediate frequency amplifier and a decoder unit is positioned adjacent to the intermediate frequency amplifier, which can be set to respond to differently coded pulses.

The modulator for the magnetron is separated from the decoder unit by a compressible spacer element which is arranged to be compressed when the unit is positioned within the housing. A power supply unit is positioned with a portion in contact with the front cover and includes elements embedded in a resilient material and a heat sink in heat conducting relation with the R.F. filter. The components on the decoder and modulator are also embedded in the resilient material, and the modulator including a heat conducting member which supports the silicon controlled rectifier thereof and is positioned to engage the housing to conduct heat thereto. The components are held in assembled relation by rods which extend from the front plate to the heat conducting member of the modulator. When the unit is provided in the housing the compression of the elements causes the resilient material to expand to engage the side walls of the housing so that the unit is firmly positioned therein.

The transponder unit of the invention can be produced for operation in various frequency bands. The construction is believed to be applicable in particular in the C-band in the frequency range from 5400 to 5900 mc. and in the X-band in the frequency range from 85 to 9600 mc.

FIG. 1 illustrates the transponder unit in a completely enclosed housing. The housing is formed by a main part 10, which is a five-sided housing, and is completed by the front cover 11. All the connections and controls for the unit are provided on the front cover 11. This includes the antenna connector 12, the power and test connector 14, the RF. filter tuning members 15, 16 and 17, a screw 18 which is removable to provide access to the local oscillator tuning, a screw 19 which is removable to provide access to the decoder code selector, and a screw 20 which is removable to provide access for tuning the transmitter magnetron oscillator.

The overall housing is of rectangular configuration with ears 21 at the corners which are used for screws to fasten the cover onto the main housing. A foot 22 is provided on the frotnt cover 11, and a similar foot 23 is provided at the rear of the main housing 10 (FIGS. 2 and 3) for mounting the unit.

As shown in FIG. 2, the antenna connector 12 provides a connection to a circulator or diplexer 25. The circulator includes a flat center conductor 26 having four arms, and a ferrite member for controlling the conduction therein. One arm 27 of the conductor 26 is connected to the antenna connector 12. A second arm 28 is connected to the input coupling loop 34 of the cavity 36 of the R.F. filter 35. The third arm 29 is connected through conducting pin 32, which will be described, to the transmitter. The fourth arm 30 is connected to a terminating load member 31.

The circulator 25 includes one member 24 (FIGS. 3 and 4) which is integral with the front cover. The other parts forming the circulator are fastened by screws to the member 24, and this positively positions the circulator with respect to the front cover.

The circulator 25 is effective during reception to apply input signals from the antenna through connector 12 and through arms 27 and 28 to the R.F. filter 35. During transmission, the circulator applies signals from the transmitter magnetron 33 through pin 32 and arms 29 and 27 to the antenna connector 12 for transmitting signals therefrom. Signals from the transmitter which are reflected by the antenna, and then by the R.F. filter 35, are applied to the load 31, and are effectively terminated thereby so that they are not reflected back into the magnetron.

The R.F. filter 35 includes three coaxial cavities or lines identified as 36, 37 and 38 in FIG. 4. These cavities are provided in a block which is integral with the front cover 11. The signals from circulator 25 are applied to the first cavity 36 through the coupling loop 34, which is connected to the arm 28 of the conductor 26 of the circulator. The loop 34 may be formed of wire with a flattened portion which has a large area engagement with the flat arm 28 of the center conductor of the circulator to provide a good electrical connection therebetween with a minimum discontinuity. The cavity 36 has a center conductor 39 which is adjusted by the control 15 (FIG. 2) extending from the front cover 11, previously mentioned. This controls the length of the center conductor to thereby control the tuning of the cavity.

For operation in the C-band, the coaxial cavities may be designed to operate at quarter-wave length, and in the X-band the cavities may be designed to operate at three quarter-wave length. This makes the dimensions of the coupling apertures and loops for the two bands in the same general range of values, and the positioning can also be similar. Therefore, the entire units for the two bands can have essentially the same overall dimensions to thereby facilitate production.

As previously stated, the R.F. filter 35 includes three coaxial cavities 36, 37 and 38, and each cavity has a center conductor as described. The center conductors for cavities 37 and 38 are controlled by the tuning members 16 and 17. Signals are coupled from the circulator 25 through loop 34 to the cavity 36, and from cavity 36 through aperture 36a to cavity 37, and from cavity 37 through aperture 37a to cavity 38. The output signals from the R.F. filter are applied from cavity 38 to conductor 54, which is connected to the mixer 52.

FIG. 3 shows the connection from the circulator to the transmitter oscillator. The transmitter oscillator may be a magnetron 33, and the connection thereto is provided by the conducting pin 32. As previously described, this pin engages the arm 29 of the center conductor 26 of the circulator. The pin 32 is supported by a bushing and may have an enlarged head 32a which is soldered to the conducting arm 29. Removal of the screw 20 on the front cover provides access to the tuning adjustment for the transmitter magnetron. The magnetron 33 is also secured to the front plate so that the front plate conducts heat therefrom.

The receiver includes a local oscillator 40 (FIG. 2) having a transistor 41 operating in a resonant cavity. The local oscillator 40 is secured to the block which forms the R.F. filter 35, and heat from the transistor thereof is conducted from this block to the front cover. The construction of the oscillator may be as described and claimed in patent application Serial No. 423,682, filed January 6, 1965, by Charles Adams, now Patent No. 3,271,698, and assigned to the assignee of the present invention. The oscillator is tuned by a variable capacitor 40a which is accessible when the screw 18 in the front cover is removed. Signals from the oscillator 40 are coupled from coupling loop 42 to the strip line 44 supported between insulating plates 45 (FIGS. 2 and 4). The oscillator housing forms one ground plane, and a conducting plate 43 forms the other ground planes.

The strip line 44 applies signals from the oscillator 40 to a varactor diode 46 (FIG. 4) which produces harmonics used to provide multiplier action. The varactor 46 applies signals to an interdigital filter 50 which selects the desired harmonic. The output from filter 50 is derived at conductor 51 which is also connected to the mixer unit 52.

The mixer 52 is provided by a strip line 53 supported between insulating boards (FIG. 4). Ground planes are provided on both sides of the boards. The strip line has formed therein a hybrid loop 55 for applying signals to diodes 56 and 57 (FIG. 5). The mixer output is filtered by stubs 58, 59, 60 and 61 provided on the strip line, which removes the original RF and oscillator signals. The output signals from the mixer are derived by output conductor 62 and applied to intermediate frequency amplifier 63. The intermediate frequency amplifier is provided in a rectangular enclosing shield. It will be noted that the mixer 52 has an extension 49 which extends into a recess in the intermediate frequency amplifier 63 to facilitate connection therebetween. The amplified signals from the amplifier 63 are applied to the decoder unit 64.

A power supply is provided for the transponder and includes a portion extending from the test and power connector 14 in the area marked 65 in FIGS. 5 and 6. The power supply also has a portion extending below the magnetron 33 and the circulator 25, in the area indicated as 66 on FIGS. 2, 3 and 6. The power supply includes a heat sink 67 (FIG. 2), on which the power transistors thereof are mounted. This heat sink 67 forms the closure for the cavities 36, 37 and 38 of the R.F. filter 35, and is in direct heat conducting relation therewith. Accordingly, the block which forms the filter 35 also serves as the heat conducting member for removing heat from the power supply transistors. Since this block is formed as an integral part of the front cover 11, heat is efficiently conducted to the front cover and radiated from the unit.

The power supply includes switching apparatus 68 (FIGS. 5 and 6) which controls the value of a reference voltage applied to decoder unit 64. This causes the decoder to respond to pulses having a particular relation. This switching apparatus 68 is accessible from the front cover of the unit when the screw 19 is removed.

The modulator 70 of the transmitter which pulses the magnetron 33 is provided at the end of the unit remote from the front cover 11. This is spaced from the decoder unit 64 by a compressible layer 71 as shown in FIGS. 5 and 6. The modulator includes a rigid heat conducting member 72 therein which also forms a heat sink for the silicon controlled rectifier provided in the modulator. The various elements of the transponder unit are held in assembled relation by rods 74 (FIG. 6) extending from the front cover 11 to the member 72 of the modulator.

The modulator, decoder, and power supply sections are potted in a resilient compressible material which supports the various elements thereof. As an example a silicon rubber material identified as SYLGARD No. 182 and made by Dow Corning Corp. may be used. This material has effective mechanical damping and insulating properties. The compressible layer 71 is formed from such material and includes ribs 75 to permit compression of the assembled device. When the device is provided in the housing 10 and the front cover 11 is secured to the main housing, the various layers are compressed sufficiently to cause the resilient material to expand in cross-section. This causes the resilient material of the sections to engage the sides of the housing 10, so that the sections are firmly held in position. When the unit is thus compressed in the housing, the heat conducing member 72 of the modulator is in firm contact with the bottom wall of the housing to provide heat conduction therebetween.

It is therefore seen that the components of the transponder are shaped and positioned with respect to each other that a very compact unit is provided. The overall dimensions of a unit having a sensitivity of −65 dbm. and a power output of 400 watts are only approximately 2.8 x 3.4 x 4.0 inches. The components are arranged so that all adjustments can be made from the front cover. The components which produce substantial heat all are in heat conducting relation with the housing to conduct the heat thereto for radiation thereby. More specifically, the magnetron, the local oscillator and the power supply transistors are directly connected to the front cover and/ or to the R.F. filter block which is integral therewith. The silicon controlled rectifier of the modulator is supported on a heat conducting member which is held in engagement with the back or bottom of the main housing so that the heat from the modulator is conducted to the housing.

We claim:

1. Transponder apparatus including in combination, a circulator of rectangular configuration having a conductor with a single junction, connector means for connecting said conductor to an antenna, receiver means including a filter having a first wall engaging said circulator with input coupling means extending therethrough and connected to said conductor, said filter having a second wall with first output coupling means extending therethrough, a local oscillator unit having a wall aligned with said second wall of said filter and having second output coupling means extending therefrom, a mixer unit including a flat surface engaging said second wall of said filter and said wall of said local oscillator unit, said mixer unit including circuit means connected to said first and second output coupling means, transmitter means including oscillator means of rectangular configuration having sides adjacent said circulator and said filter, and means connecting said conductor of said circulator to said transmitter means.

2. Transponder apparatus in accordance with claim 1 wherein said receiver means includes an intermediate frequency amplifier connected to said mixer unit, and decoder means connected to said intermediate frequency amplifier, and said transmitter means includes modulator means connected to said oscillator means for modulating the frequency thereof, and means connecting said decoder means to said modulator means to control the operation thereof.

3. Transponder apparatus in accordance with claim 2 including power supply means and a rectangular housing, and wherein all of the components of the transponder apparatus are provided in said housing.

4. Transponder apparatus in accordance with claim 1 wherein said circulator includes four conducting arms connected to a single junction and load means, with said first arm connected to said connector means, said second arm connected to said input coupling means, said third arm connected to said transmitter means, and said fourth arm connected to said load means.

5. Transponder apparatus including in combination, housing means including a first portion forming a five sided receptacle and a cover portion, a circulator of rectangular configuration secured to said cover portion and having a flat conducting member with first, second, third and fourth arms, connector means for connecting said first arm to signal conducting means, a cavity filter including a block integral with said cover portion and having a first wall adjacent one side of said circulator with input coupling means extending therethrough into connecting engagement with said second arm of said conducting member, said filter having a second wall with first output coupling means extending therefrom, a local oscillator unit having a portion with a wall aligned with said second wall and having second output coupling means extending therefrom, a mixer unit including a flat structure overlapping said second wall and said wall of said local oscillator unit, said mixer unit including circuit means connected to said first and second output coupling means, rectangular transmitter oscillator means connected to said cover portion and having walls adjacent said circulator and said cavity filter, a conducting pin connected to said third arm of said conducting member and extending at a right angle thereto into connecting engagement with said transmitter oscillator means, and terminating load means connected to said fourth arm of said conducting member.

6. Transponder apparatus in accordance with claim 5 including power supply means having a portion engaging said cover portion and a heat conducting portion engaging said block of said filter for conducting heat thereto, an intermediate frequency amplifier connected to said mixer, decoder means connected to said intermediate frequency amplifier, modulator means connected to said decoder unit and said transmitter oscillator means, and a compressible member included in said housing means and compressed whein said cover portion is secured to said receptacle to hold the components of the transponder apparatus firmly in position.

7. Transponder apparatus in accordance with claim 6 wherein said intermediate frequency amplifier is provided in a rectangular shield having a recessed portion, and said mixer unit has a portion extending into said recessed portion and providing a connection to said intermediate frequency amplifier.

8. Transponder apparatus in accordance with claim 5 including power supply means having a portion engaging said cover portion and a heat conducting portion engaging said block of said filter for conducting heat thereto, an intermediate frequency amplifier connected to said mixer, decoder means connected to said intermediate frequency amplifier, and modulator means connected to said decoder unit and said transmitter oscillator means, and wherein components of said power supply means, said decoder means and said modulator means are embedded in a compressible material for holding such components firmly in position.

9. Transponder apparatus in accordance with claim 5 including power supply means having a portion engaging said cover portion and a heat conducting portion engaging said block of said filter for conducting heat thereto, an intermediate frequency amplifier connected to said mixer, decoder means connected to said intermediate frequency amplifier, modulator means connected to said decoder unit and said transmitter oscillator means, and wherein components of said power supply means, said decoder means and said modulator means are embedded in a compressible material for holding such components firmly in position, and a sheet having ribs thereon and formed of said compressible material interposed between said decoder means and said modulator means, said ribs of said sheet being compressed when said cover portion is secured to said receptacle to hold the components of said transponder apparatus firmly in position.

10. Transponder apparatus in accordance with claim 5 including power supply means having a first portion engaging said cover portion and a second portion extending below said circulator, said cavity filter and said transmitter means, said second portion of said power supply means including heat conducting means engaging said block of said filter for conducting heat thereto, an intermediate frequency amplifier enclosed in a rectangular conducting shield adjacent said power supply means, said mixer unit and said intermediate frequency amplifier having interengaging portions providing a connection therebetween, decoder means adjacent to and connected to said intermediate frequency amplifier, modulator means connected to said decoder means and said transmitter oscillator means, said modulator means including a heat conducting member positioned at the end of said apparatus remote from said cover portion, connecting means connected between said cover portion and said heat conducting member, said power supply means, said decoder means and said modulator means having components embedded in a compressible material for holding such components firmly in position, and a sheet formed of said compressible material and having ribs thereon interposed between said decoder means and said modulator means, said ribs of said sheet being compressed when said cover portion is secured to said receptacle to hold the components of said transponder apparatus firmly in position and to hold said heat conducting member in contact with the bottom of said receptacle.

11. Transponder apparatus in accordance with claim 5 including power supply means having a first portion engaging said cover portion and a second portion extending below said circulator, said cavity filter and said transmitter means, said second portion of said power supply means including heat conducting means engaging said block of said filter for conducting heat thereto, an intermediate frequency amplifier enclosed in a rectangular conducting shield adjacent said power supply means, said mixer unit and said intermediate frequency amplifier having interengaging portions providing a connection therebetween, decoder means adjacent to and connected to said intermediate frequency amplifier, modulator means connected to said decoder means and said transmitter oscillator means, said modulator means including a rigid heat conducting member positioned at the end of said apparatus remote from said cover portion, connecting means connected between said cover portion and said heat conducting member, and a sheet formed of compressible material and having ribs thereon interposed between said decoder means and said modulator means, said ribs of said sheet being compressed when said cover portion is secured to said receptacle to hold the components of said transponder apparatus firmly in position and to hold said heat conducting member in contact with the bottom of said receptacle.

12. Transponder apparatus in accordance with claim 5 including power supply means having a first portion engaging said cover portion and a second portion extending below said circulator, said cavity filter and said transmitter means, said second portion of said power supply means including heat conducting means engaging said block of said filter for conducting heat thereto, an intermediate frequency amplifier enclosed in a rectangular conducting shield adjacent said power supply means, said mixer unit and said intermediate frequency amplifier having interengaging portions providing a connection therebetween, decoder means adjacent to and connected to said intermediate frequency amplifier, modulator means connected to said decoder means and said transmitter means, said modulator means including a rigid supporting member positioned at the end of said apparatus remote from said cover portion, connecting means connected between said cover portion and said rigid supporting member, said power supply means, said decoder means and said modulator means having components embedded in a compressible material for holding such components firmly in position, and a sheet formed of said compressible material and having deformable ribs thereon interposed between said decoder means and said modulator means, said compressible material being compressed when said cover portion is secured to said receptacle and spreading in cross section to bear against the sides of said receptacle to hold the components of said transponder apparatus firmly in position and to hold said heat conducting member in contact with the bottom of said receptacle.

References Cited

UNITED STATES PATENTS 2,530,979 11/1950 Matland et al. _____ 343—6.8 X
3,152,304 10/1964 Ringer et al. _____ 317—101 X RODNEY D. BENNETT, *Primary Examiner.*

R. E. BERGER, *Assistant Examiner.*